Patented Dec. 23, 1924.

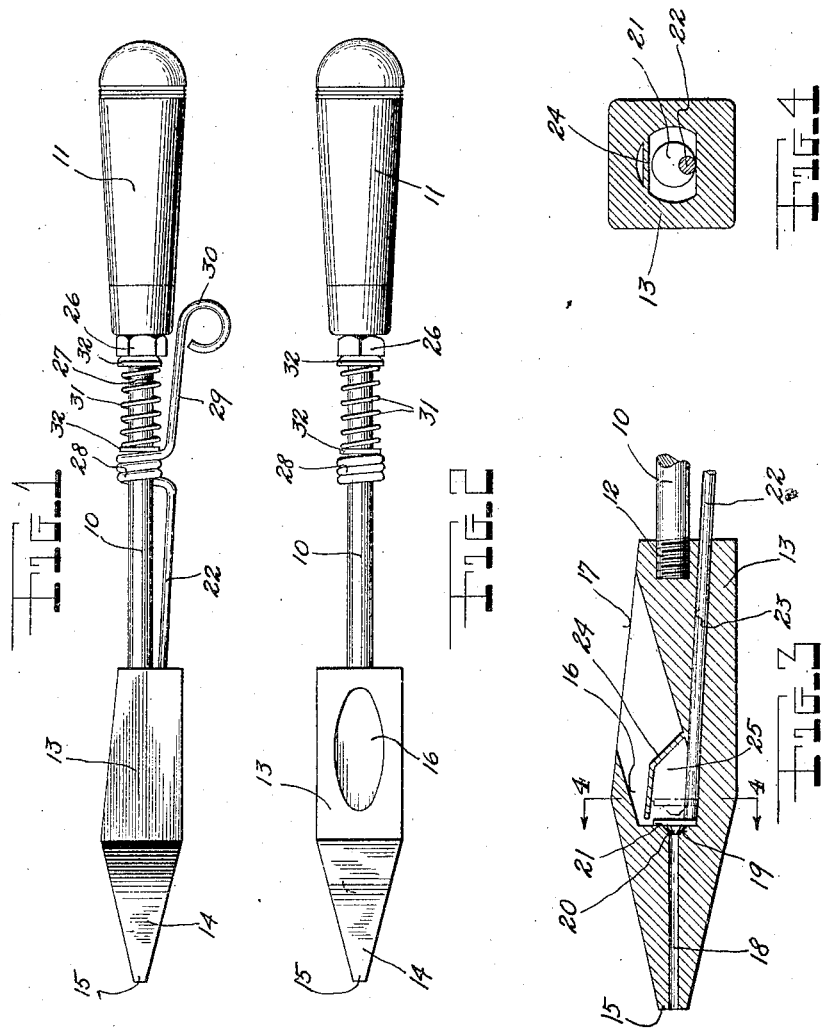

1,520,645

UNITED STATES PATENT OFFICE.

HENRY J. GREVERS AND JERALD DORSA, OF BROOKLYN, NEW YORK.

SOLDERING IRON.

Application filed October 19, 1923. Serial No. 669,454.

*To all whom it may concern:*

Be it known that we, HENRY J. GREVERS and JERALD DORSA, citizens of the United States, residing at Brooklyn, in the county of Kings and State of New York, have invented certain new and useful Improvements in Soldering Irons, of which the following is a specification.

The main object of this invention is to provide a soldering iron having means thereon whereby soldering metal can be placed into the soldering head and transformed into a molten state so as to be at all times ready for the application of the soldering iron.

Another object is to provide a soldering iron as mentioned having additional means thereon for opening and closing a vent thru which the molten solder metal exits when being applied to the work.

These and other objects will become apparent in the description below, in which characters of reference refer to like-named parts in the drawing.

Referring briefly to the drawing, Figure 1 is a front elevational view of the soldering iron, showing the same in its entirety.

Figure 2 is a top plan view of the same.

Figure 3 is a longitudinal sectional view taken substantially centrally thru the soldering head and showing the solder metal feeding valve in closed position.

Figure 4 is a cross-sectional view taken on line 4—4 of Figure 3.

Referring in detail to the drawing, the numeral 10 indicates a shank of circular cross section and having a handle 11 at its upper end. Threads 12 formed on the lower end of the shank engage a soldering head 13 in the usual manner. The forward end 14 of the soldering iron tapers and forms a substantially blunt nose 15. A reservoir 16 is formed by hollowing out a portion of the head, said reservoir communicating with an opening on the upper face 17 of the head and passing angularly into the confines of the same toward the nose 15. A vent 18 communicates with the nose 15 at its forward end, the rear end opening into the reservoir 16. At the rear end of the vent, a conical seat 19 is formed upon which a valve 20 is normally seated. This valve is provided with a flange 21 rigidly connected to a stem 22 which slides in a circular channel 23. The reservoir is divided into two compartments by a dividing wall 24, the latter forming a chamber 25 in which the valve 20 is movable. The greater portion of the reservoir retains the soldering metal and the dividing wall prevents the molten solder from passing into the chamber 25.

A nut 26 is mounted adjacent the lower end of the handle 11 on the shank 10, said shank being threaded at this place to permit lateral adjustment of the nut, the threads being indicated by the numeral 27. The rear end of the stem 22, which projects from the soldering head, extends substantially parallel to the shank 10 and is formed into coils 28 which envelop the shank and form a guide for the movement of said stem. After the coils 28 are formed, the extending end 29 of the last coil is again bent substantially parallel to the shank and has a finger ring 30 at its rear end forming a trigger for moving the stem rearward. A resilient coil spring 31 is mounted on the shank 10 between the nut 26 and the coils 28 of the stem, the ends of the spring being seated upon washers 32.

The soldering iron is used in the following manner. A stick of solder in solid form is inserted into the reservoir 16 after the soldering head 13 has been heated. In a short time, the lower end of the stick will turn to a molten solder metal, after which the nose 15 of the soldering head may be applied to the work. As this is done, the finger is inserted into the ring 30 which serves as a trigger, and as the trigger is pulled rearward, the stem 22 lifts the valve 20 from its seat, and when the vent is in open communication with the reservoir 16, the soldering head may be slightly tilted to permit a quantity of solder to pass from the reservoir 16 into the vent from which it will pass to the nose where it may be applied to the work. As the trigger is released, the spring 31 will urge the coils 28 toward the soldering head, thereby seating the valve upon its seat 19, this operation closing the vent 18. Adjustment of the tension is provided by the nut 26, and when the nut is moved laterally toward the head 13, the tension is increased, and when moved in an opposite direction, is decreased, this adjustment being accomplished by rotation of the nut as is apparent.

We claim:—

1. A soldering iron comprising a soldering head, a shank and a handle extending from said head, a reservoir in said head, a dividing wall in the reservoir, said head having a vent communicating with the nose and the reservoir, said vent having a conical seat at one end, a valve normally resting on said seat closing the vent, a flange on said valve, said head having a channel, a stem slidable in said channel and rigid with the valve flange, the rear end of said stem being twisted about the shank, a spring on said shank behind the twisted end of the stem, said spring being adapted to normally urge the stem forward to close the valve, and a trigger extending from the twisted end of said stem for opening said valve.

2. A soldering iron comprising a rectangular head having a tapering end forming a blunt nose, said end having a feeding vent therein, a shank and a handle extending from said head, a reservoir opening on one side of said head and communicating with the feeding vent, a dividing wall, a valve in said reservoir adapted to normally cover the feeding vent, a stem extending from said valve out of the head, the rear end of said stem being twisted about the shank, a spring on said shank behind the twisted end of the stem and a trigger extending from the twisted end of said stem for opening said valve.

3. A soldering iron comprising a rectangular head having a tapering blunt nose, one side of said head being inclined, a reservoir passing into the head from the inclined side, a feeding vent connecting the reservoir with the nose of said head, a shank, and a handle extending from said head, said head having a channel, a stem slidable in said channel substantially parallel to the shank, the rear end of said stem being twisted about the shank, a spring on said shank behind the twisted end of the stem, a trigger extending extending from the twisted end of said stem, a valve integral with the stem in the reservoir and adapted to close the feeding vent when said stem is lowered by a spring, and a dividing wall rising from one side of the reservoir and adapted to partly enclose the valve, the lower edge of the wall being adapted to guide melted solder beneath the valve head of the stem when said valve is lifted.

In testimony whereof we affix our signatures.

HENRY J. GREVERS.
JERALD DORSA.